United States Patent
Lam et al.

(10) Patent No.: US 10,421,488 B2
(45) Date of Patent: Sep. 24, 2019

(54) AXLE ASSEMBLY WITH TAPERED KINGPIN INTERFACE

(71) Applicant: ArvinMeritor Technology, LLC, Troy, MI (US)

(72) Inventors: Duy Lam, Baltimore, OH (US); Robert Brazeau, Kalamazoo, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 185 days.

(21) Appl. No.: 15/466,917

(22) Filed: Mar. 23, 2017

(65) Prior Publication Data

US 2018/0273091 A1 Sep. 27, 2018

(51) Int. Cl.
*B62D 7/18* (2006.01)

(52) U.S. Cl.
CPC ..................... *B62D 7/18* (2013.01)

(58) Field of Classification Search
CPC ...................................................... B62D 17/18
See application file for complete search history.

(56) References Cited

U.S. PATENT DOCUMENTS

| | | |
|---|---|---|
| 1,613,768 A | 1/1927 | Perrot |
| 3,388,923 A | 6/1968 | Maynard |
| 3,915,469 A | 10/1975 | Vanice |
| 3,981,513 A | 9/1976 | Erskine |
| 4,229,017 A | 10/1980 | Hagedorn |
| 4,286,799 A | 9/1981 | Ayres |
| 4,690,418 A * | 9/1987 | Smith ............... B62D 7/18 280/93.512 |
| 5,350,183 A | 9/1994 | Shealy |
| 5,588,660 A | 12/1996 | Paddison |
| 6,109,632 A | 8/2000 | Wei |
| 6,202,781 B1 * | 3/2001 | Ima ............... B60K 17/30 180/252 |
| 6,217,046 B1 * | 4/2001 | Bodin ............... B62D 7/18 280/93.512 |
| 6,419,250 B1 | 7/2002 | Pollock et al. |
| 6,616,156 B1 | 9/2003 | Dudding et al. |
| 6,663,124 B1 | 12/2003 | Thompson |
| 6,799,811 B1 | 10/2004 | Dauber et al. |
| 7,665,746 B2 | 2/2010 | Platner |
| 7,686,312 B2 | 3/2010 | Fuks et al. |
| 8,070,177 B2 | 12/2011 | Eveley |
| 8,490,986 B1 | 7/2013 | Ostrander et al. |

(Continued)

FOREIGN PATENT DOCUMENTS

| | | |
|---|---|---|
| GB | 502031 A | 3/1939 |
| JP | 2002120747 A | 4/2002 |

OTHER PUBLICATIONS

European Patent Office, Extended European Search Report for Application No. EP18157433.6-1013, dated Aug. 2, 2018, 10 pages.

(Continued)

*Primary Examiner* — Darlene P Condra
(74) *Attorney, Agent, or Firm* — Brooks Kushman P.C.

(57) ABSTRACT

An axle assembly having an axle beam and a kingpin. The axle beam may have a kingpin receiving hole that may have a tapered portion that extends between a lower surface of the axle beam and an upper surface of the axle beam. The kingpin may be disposed in the kingpin receiving hole and may have a kingpin taper that mates with the tapered portion.

20 Claims, 4 Drawing Sheets

(56) References Cited

U.S. PATENT DOCUMENTS

| | | | |
|---|---|---|---|
| 8,764,034 B2 * | 7/2014 | Wells | B62D 7/18 |
| | | | 280/93.511 |
| 9,090,283 B1 | 7/2015 | Lam et al. | |
| 2002/0159826 A1 | 10/2002 | Moses et al. | |
| 2014/0042722 A1 | 2/2014 | Lam | |
| 2014/0361505 A1 * | 12/2014 | Ormiston | B62D 7/18 |
| | | | 280/93.512 |
| 2018/0141377 A1 * | 5/2018 | Bloink | B62D 7/18 |

OTHER PUBLICATIONS

Meritor Heavy Vehicle Systems, LLC, Maintenance Manual 2, Front Non-Drive Steer Axles, All Mentor Conventional, Easy Steer Plus (Trademark) and MFS Series, Revised Jan. 2016, Troy, Michigan, USA.

\* cited by examiner

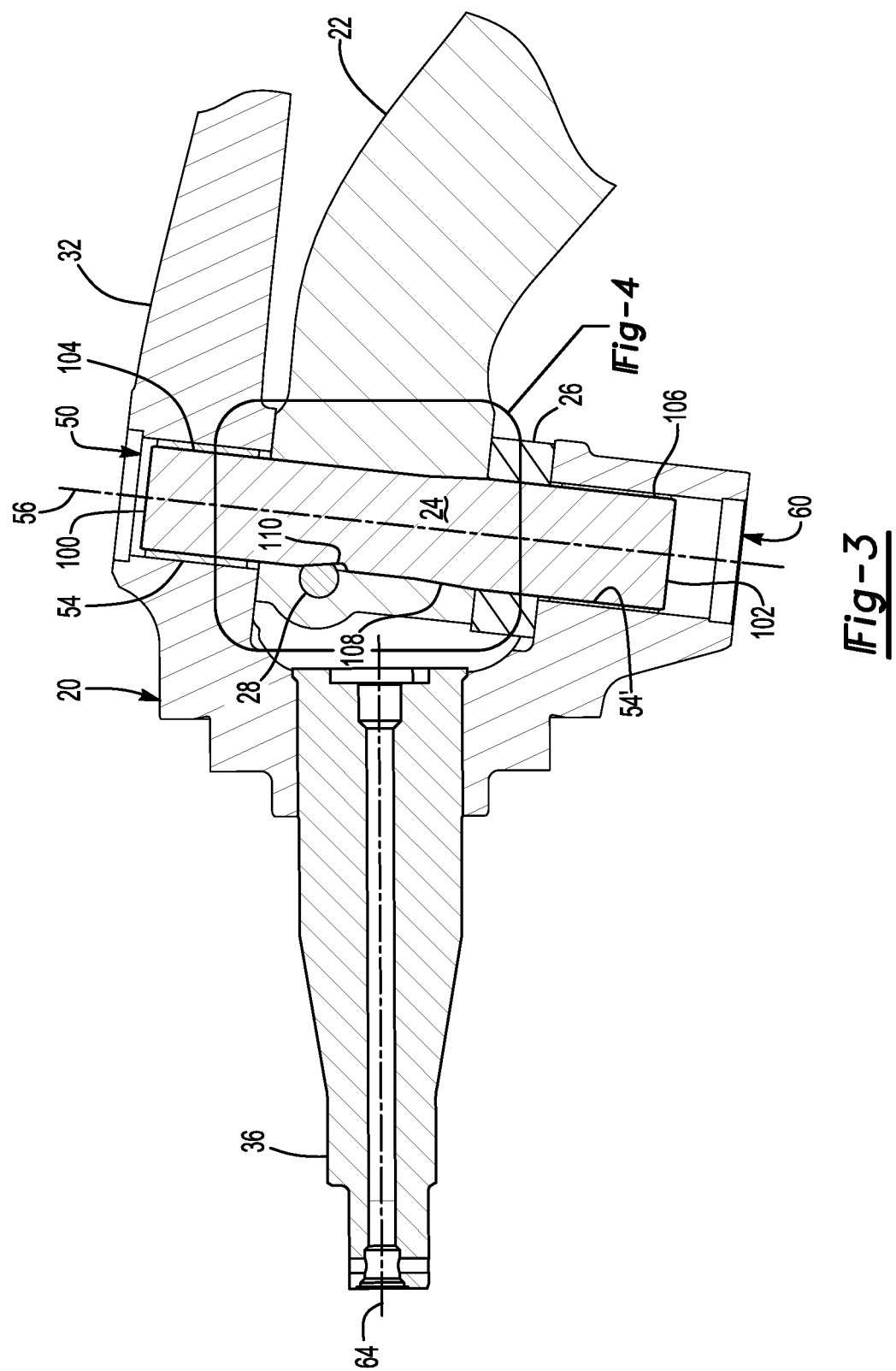

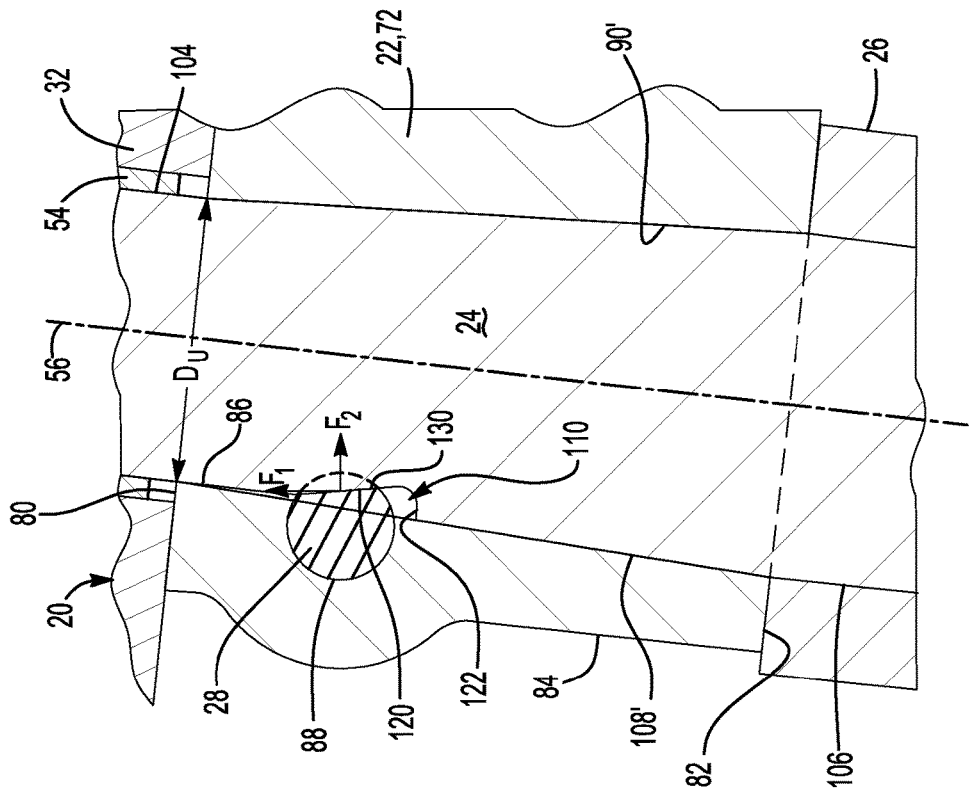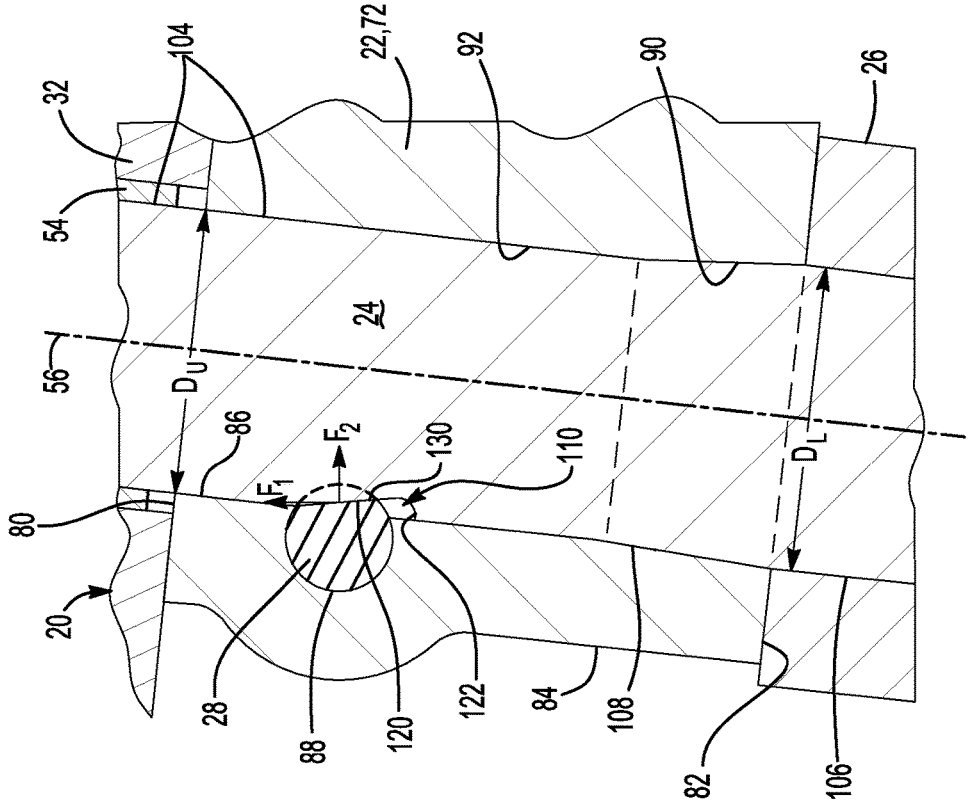

AXLE ASSEMBLY WITH TAPERED KINGPIN INTERFACE

TECHNICAL FIELD

This disclosure relates to an axle assembly having a tapered interface between a kingpin and an axle beam.

BACKGROUND

An axle assembly having a kingpin is disclosed in United States Patent Publication No. 2014/0042722.

SUMMARY

In at least one embodiment an axle assembly is provided. The axle assembly may have an axle beam, a kingpin, and a fastener. The axle beam may have an upper surface, a lower surface, a kingpin receiving hole, and a fastener hole. The lower surface may be disposed opposite the upper surface. The kingpin receiving hole may extend from the upper surface to the lower surface. The kingpin receiving hole may have a tapered portion that may extend between the lower surface and the upper surface. The fastener hole may intersect the kingpin receiving hole. The kingpin may be disposed in the kingpin receiving hole. The fastener may be disposed in the fastener hole. The fastener may engage the kingpin to inhibit movement of the kingpin.

In at least one embodiment an axle assembly is provided. The axle assembly may include an axle beam, a kingpin, a fastener, and a steering knuckle. The axle beam may include an upper surface, a lower surface, a kingpin receiving hole, and a fastener hole. The lower surface may be disposed opposite the upper surface. The kingpin receiving hole may be disposed around a first axis and may extend from the upper surface to the lower surface. The kingpin receiving hole may include a tapered portion. The tapered portion may extend from the lower surface toward the upper surface. The kingpin receiving hole may have a larger diameter at the lower surface than at the upper surface. The fastener hole may intersect the kingpin receiving hole. The kingpin may be received in the kingpin receiving hole. The kingpin may have a kingpin taper that may mate with the tapered portion to inhibit movement of the kingpin toward the upper surface. The fastener may be disposed in the fastener hole. The fastener may engage the kingpin to inhibit movement of the kingpin away from the upper surface. The steering knuckle may be rotatably disposed on the kingpin.

BRIEF DESCRIPTION OF THE DRAWINGS

FIG. 3 is a section view of the axle assembly along section line 3-3.

FIG. 4 is a magnified view of a portion of the axle assembly shown in FIG. 3.

FIG. 5 is a magnified view of another configuration of the axle assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
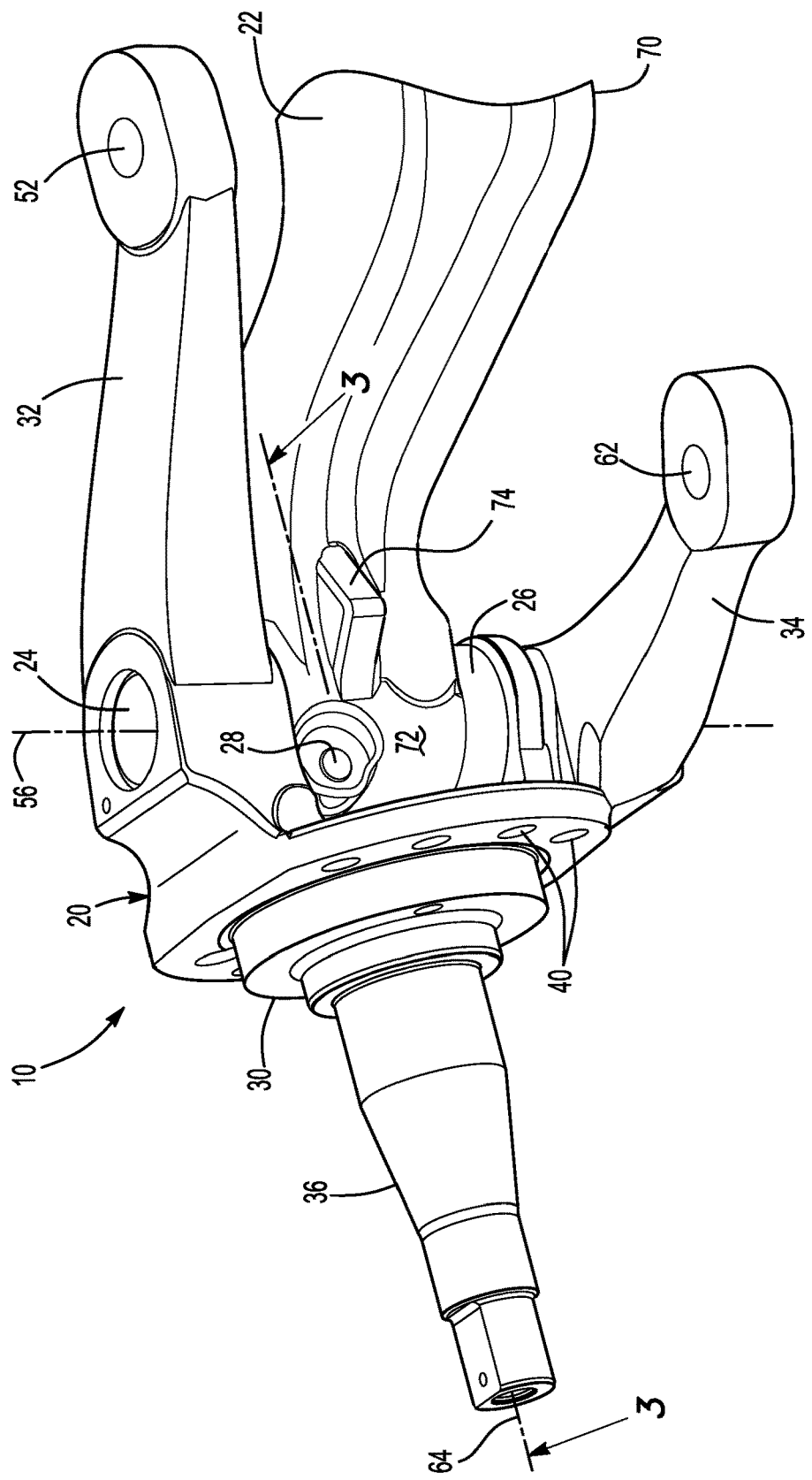
FIG. 1 is a perspective view of a portion of an axle assembly.
Figure 2:
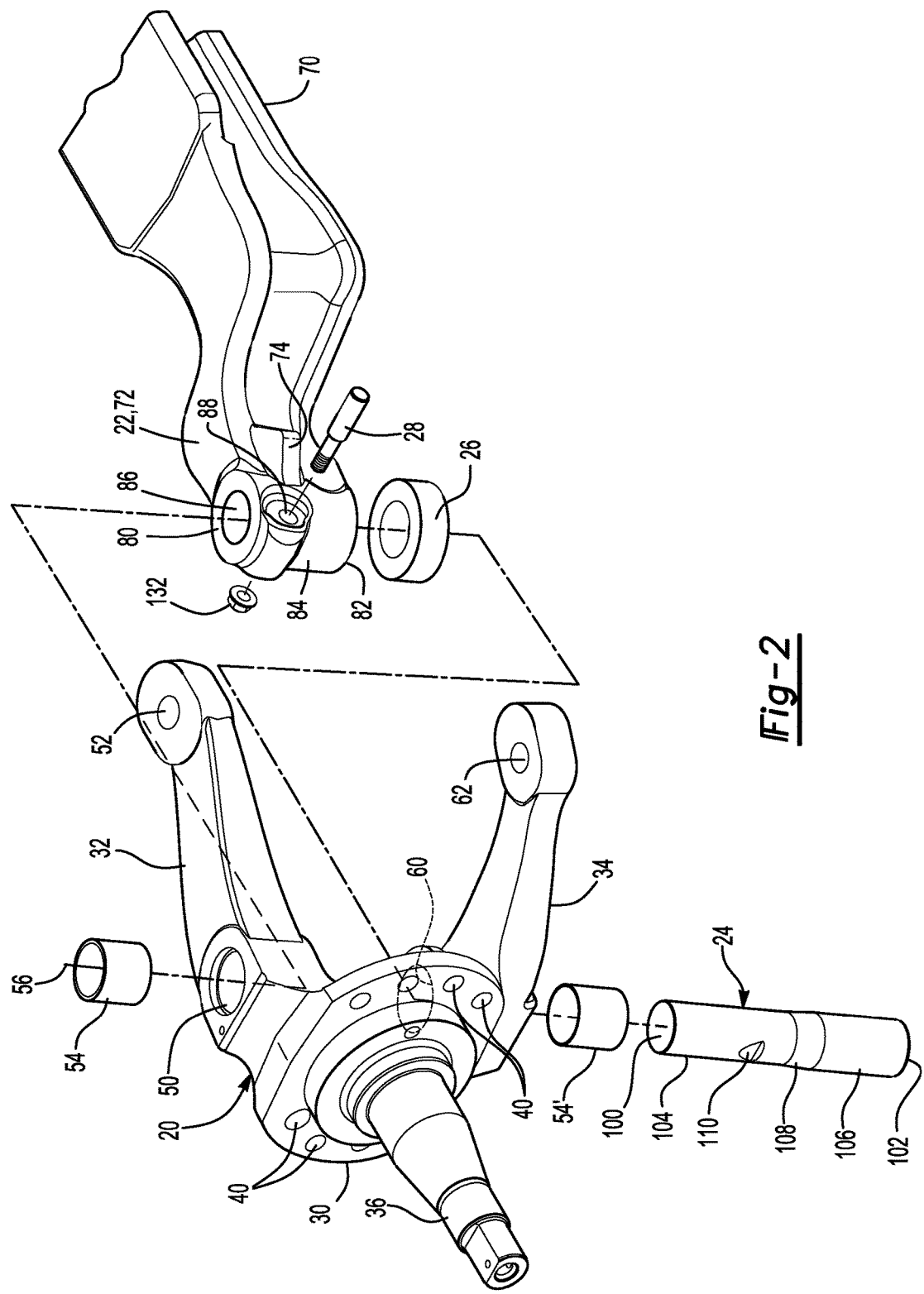
FIG. 2 is an exploded view of the axle assembly shown in FIG. 1.

Referring to FIGS. 1 and 2, an example of an axle assembly 10 is shown. The axle assembly 10 may be provided with a motor vehicle, such as a truck, bus, farm equipment, military transport or weaponry vehicle, or cargo loading equipment for land, air, or marine vessels. The axle assembly 10 may include a steering knuckle 20, an axle beam 22, a kingpin 24, a thrust bearing 26, and a fastener 28.

The steering knuckle 20 may be part of a steering system that may steer or change the direction of travel of the vehicle. The steering knuckle 20 may interconnect the axle beam 22 to a vehicle wheel. The steering knuckle 20 may have a unitary or one-piece configuration or may have a multi piece configuration. In at least one configuration, the steering knuckle 20 may include a body 30, a first arm 32, a second arm 34, and a spindle 36.

The body 30 may provide structural support for the steering knuckle 20 and may facilitate mounting of components to the steering knuckle 20. For example, the body 30 may include a plurality of brake caliper mounting holes 40. A brake caliper mounting hole 40 may receive a corresponding fastener that may facilitate mounting of a brake caliper to the steering knuckle 20.

Referring to FIGS. 2 and 3, the first arm 32 may extend from the body 30. For instance, the first arm 32 may be integrally formed with the body 30 and may be disposed above the spindle 36 and near or at the top of the body 30. The first arm 32 may include a first kingpin hole 50 and a steering arm hole 52.

The first kingpin hole 50 may receive the kingpin 24 and a bearing 54. The bearing 54 may extend around the kingpin 24 and may facilitate rotation of the steering knuckle 20 about a first axis 56 and with respect to the kingpin 24 and the axle beam 22. The first axis 56 may be disposed in a center plane that may bisect the axle beam 22. The section view in FIGS. 3-5 is taken along this center plane. The bearing 54 may have any suitable configuration. For example, the bearing 54 may be a journal bearing or a roller bearing assembly that may be include a plurality of rolling elements that may rotatably support the kingpin 24. In at least one configuration, the first kingpin hole 50 may be a through hole that may extend through the first arm 32. In addition, the first kingpin hole 50 may be a cylindrical hole that may be radially disposed with respect to the first axis 56.

The steering arm hole 52 may be disposed proximate a distal end of the first arm 32. The steering arm hole 52 may facilitate coupling of the steering knuckle 20 to a linkage, such as a rod or steering arm, that may transmit force to rotate the steering knuckle 20 about the first axis 56.

The second arm 34 may extend from the body 30 and may be spaced apart from the first arm 32. The second arm 34 may be integrally formed with the body 30 and may be disposed below the spindle 36 and near or at the bottom of the body 30. The second arm 34 may include a second kingpin hole 60 and a tie rod mounting hole 62.

The second kingpin hole 60 may be coaxially disposed with the first kingpin hole 50. For instance, the second kingpin hole 60 may be a cylindrical hole that may be radially disposed with respect to the first axis 56. The second kingpin hole 60 may receive the kingpin 24 and another bearing 54' that may extend around the kingpin 24 and may facilitate rotation of the steering knuckle 20 about the first axis 56 and with respect to the kingpin 24 and the axle beam 22. The bearing 54' may have any suitable configuration. For example, the bearing 54' may be a journal bearing or a roller bearing assembly that may be include a plurality of rolling elements that may rotatably support the kingpin 24. The bearing 54' that is received in the second kingpin hole 60 may have a larger diameter than the bearing 54 that is received in the first kingpin hole 50. In at least one configuration, the second kingpin hole 60 may be a through hole that may extend through the second arm 34.

The tie rod mounting hole 62 may be disposed proximate a distal end of the second arm 34. The tie rod mounting hole 62 may receive or may be coupled to a tie rod that may help facilitate steering of the vehicle.

The spindle 36 may rotatably support a wheel hub assembly that may facilitate mounting and rotation of a vehicle wheel. For example, the spindle 36 may support one or more wheel bearings that rotatably support a wheel hub to which the vehicle wheel may be mounted. The spindle 36 may extend along a second axis 64 that may be positioned between the first arm 32 and the second arm 34. In addition, the spindle 36 may extend away from the axle beam 22, the first arm 32, and the second arm 34. In the configuration shown in FIG. 3, the spindle 36 is illustrated as a separate component from the body 30 that is fixedly attached to the body 30. Alternatively, the spindle 36 may be integrally formed with the body 30 such that the spindle 36 and the body 30 are not separate components.

Referring to FIGS. 1 and 2, the axle beam 22 may be configured to be mounted to a vehicle and may be supported by a vehicle suspension system. The axle beam 22 may be made of any suitable material, such as a metal or metal alloy. In addition, the axle beam 22 may be a forging and may have a unitary one-piece construction. In at least one configuration, the axle beam 22 may include a beam portion 70, an end portion 72, and one or more stops 74.

The beam portion 70 may be configured to be mounted to the vehicle, such as via a suspension system. In at least one configuration, the beam portion 70 or a portion thereof may have a generally I-shaped cross section.

An end portion 72 may be disposed at one or more ends of the beam portion 70. For instance, the axle beam 22 may have two end portions 72 that are disposed at opposite ends of the beam portion 70. The end portion 72 may be integrally formed with the beam portion 70 and may include an upper surface 80, a lower surface 82, an outer surface 84, a kingpin receiving hole 86, and at least one fastener hole 88.

Referring to FIGS. 2, 4 and 5, the upper surface 80 may be disposed along the top of the end portion 72 and may face toward the first arm 32. As such, the upper surface 80 may face away from the second arm 34.

The lower surface 82 may be disposed opposite the upper surface 80. As such, the lower surface 82 may be disposed along the bottom of the end portion 72 and may face toward the second arm 34. The lower surface 82 may be disposed on the thrust bearing 26 and may be disposed substantially parallel to the upper surface 80 in one or more configurations.

The outer surface 84 may be an exterior surface of the axle beam 22. The outer surface 84 may extend from the upper surface 80 to the lower surface 82. In addition, the outer surface 84 may be disposed opposite the kingpin receiving hole 86.

The kingpin receiving hole 86 may receive the kingpin 24. The kingpin receiving hole 86 may extend from the upper surface 80 to the lower surface 82 and may be centered about and extend along the first axis 56. The kingpin receiving hole 86 may include a tapered portion 90 and optionally a connecting portion 92.

Referring to FIG. 4, the tapered portion 90 may extend between the lower surface 82 and the upper surface 80. The tapered portion 90 may become progressively narrower in an axial direction or direction that extends along the first axis 56 from the lower surface 82 toward the upper surface 80. For example, the tapered portion 90 may have a truncated cone shape or a frustoconical configuration in which the diameter of the tapered portion 90 progressively decreases in an axial direction that extends from the lower surface 82 toward the upper surface 80. As such the kingpin receiving hole 86 may have a larger diameter $D_L$ near the lower surface 82 or at the lower surface 82 than the diameter $D_U$ near or at the upper surface 80.

Referring to FIG. 4, the connecting portion 92 may extend from an end of the tapered portion 90 to the upper surface 80 or toward the upper surface 80. The connecting portion 92 may be centered about and may extend along the first axis 56. In at least one configuration, the connecting portion 92 may be cylindrical and may not be tapered. The connecting portion 92 may have a smaller diameter than the tapered portion 90. As such, the kingpin receiving hole 86 may have a smaller diameter at the upper surface 80 than at the lower surface 82.

Referring to FIG. 5, a configuration is shown in which the kingpin receiving hole 86 includes a tapered portion 90' but not a connecting portion 92. The tapered portion 90' may be the same or substantially similar to the tapered portion 90 in FIG. 4, but may extend from the lower surface 82 to the upper surface 80, thereby becoming progressively narrower in an axial direction that extends from the lower surface 82 to the upper surface 80. The tapered portion 90' may have a truncated cone shape or a frustoconical configuration in which the diameter of the tapered portion 90' progressively decreases in an axial direction that extends from the lower surface 82 to the upper surface 80.

Referring to FIGS. 4 and 5, a fastener hole 88 may extend through the end portion 72. For example, a single fastener hole 88 may extend partially or completely through the end portion 72 and may intersect the kingpin receiving hole 86. The fastener hole 88 may be radially positioned between the first axis 56 and the outer surface 84. Moreover, the fastener hole 88 or an axis of the fastener hole 88 and may be disposed substantially perpendicular to the first axis 56 in one or more configurations. For instance, the fastener hole 88 may be offset from the first axis 56 and extend in a chord-like manner through the end portion 72 such that the fastener hole 88 passes from the outer surface 84 to the kingpin receiving hole 86 and from the kingpin receiving hole 86 through the opposite side of the end portion 72 to the outer surface 84. The fastener hole 88 may be disposed closer to the upper surface 80 than the lower surface 82 to help improve durability as will be discussed in more detail below.

Referring to FIGS. 2 and 3, the kingpin 24 may be disposed along and may be centered about the first axis 56. The kingpin 24 may be disposed in the kingpin receiving hole 86 such that the kingpin 24 is stationary with respect to the axle beam 22. The kingpin 24 may couple the steering knuckle 20 to the axle beam 22 such that the steering knuckle 20 may rotate or pivot about the kingpin 24. More specifically, the kingpin 24 may extend through the kingpin receiving hole 86 such that opposing ends of the kingpin 24 may each be received in corresponding bearings 54, 54' that are disposed in the first kingpin hole 50 and the second kingpin hole 60, respectively. The kingpin 24 may have a first end surface 100, a second end surface 102, a first end portion 104, a second end portion 106, a kingpin taper 108, and an angled notch 110.

The first end surface 100 may be disposed at a first end of the kingpin 24. The first end surface 100 may be disposed in the first kingpin hole 50 of the steering knuckle 20.

The second end surface 102 may be disposed at a second end of the kingpin 24 and may be disposed opposite the first end surface 100. The second end surface 102 may be disposed in the second kingpin hole 60 of the steering knuckle 20.

The first end portion 104 may extend from the first end surface 100 to a first end of the kingpin taper 108. The first end portion 104 may have a cylindrical configuration that may be radially disposed with respect to the first axis 56. The first end portion 104 may be received in and may engage a corresponding bearing 54. In the configuration shown in FIG. 4, the first end portion 104 is also received in the kingpin receiving hole 86. The region of the first end portion 104 that is received in the kingpin receiving hole 86 may engage the connecting portion 92. For instance, the first end portion 104 may engage the connecting portion 92 with an interference fit. In the configuration shown in FIG. 5, the first end portion 104 is not received in the kingpin receiving hole 86 of the axle beam 22.

The second end portion 106 may be spaced apart from the first end portion 104. The second end portion 106 may extend from the second end surface 102 to a second end of the kingpin taper 108. The second end portion 106 may have a cylindrical configuration that may be radially disposed with respect to the first axis 56. Moreover, the second end portion 106 may have a larger diameter than the first end portion 104. The second end portion 106 may be received in and may engage the thrust bearing 26 and a corresponding bearing 54' that is received in the second kingpin hole 60. The second end portion 106 may not be received in the kingpin receiving hole 86.

The kingpin taper 108 may extend in an axial direction from the first end portion 104 to the second end portion 106. The kingpin taper 108 may become progressively narrower in an axial direction or direction that extends along the first axis 56 from the second end portion 106 toward the first end portion 104. For example, the kingpin taper 108 may have a truncated cone shape or a frustoconical configuration in which the diameter of the kingpin taper 108 progressively decreases in an axial direction that extends from the second end portion 106 toward the first end portion 104. As such, the kingpin taper 108 may have a smaller diameter at the first end portion 104 than at the second end portion 106.

The kingpin taper 108 may be received in the kingpin receiving hole 86 of the axle beam 22. More specifically, the kingpin taper 108 may be received in and may engage the tapered portion 90 of the axle beam 22. In the configuration shown in FIG. 4, the kingpin taper 108 may be disposed proximate the lower surface 82 and may extend from the lower surface 82 or from near the lower surface 82 of the axle beam 22 toward the upper surface 80 such that the kingpin taper 108 does not reach the upper surface 80 or the angled notch 110. In FIG. 5, the kingpin taper is designated with reference number 108'. In the configuration shown in FIG. 5, the kingpin taper 108' may extend from the lower surface 82 or from near the lower surface 82 to the upper surface 80 of the axle beam 22. As such, the angled notch 110 is disposed in the kingpin taper 108'.

The taper of the kingpin taper 108, 108' may be the same as or substantially the same as the taper of the tapered portion 90, 90'. For instance, the kingpin taper 108, 108' may be disposed parallel to the tapered portion 90, 90' and may mate with the tapered portion 90, 90' to provide a gap-free interface. The kingpin taper 108, 108' and the tapered portion 90, 90' may cooperate to inhibit axial movement of the kingpin 24 with respect to the axle beam 22. More specifically, axial movement of the kingpin 24 in an upward direction or toward the first arm 32 may be inhibited or prevented due to engagement of the kingpin taper 108, 108' with the tapered portion 90, 90'.

Referring to FIG. 2, the angled notch 110 may receive and engage the fastener 28. A single angled notch 110 or only one angled notch may be provided. The angled notch 110 may be disposed adjacent to the fastener hole 88 of the axle beam 22. As such, the angled notch 110 may be disposed closer to the upper surface 80 of the axle beam 22 than to the lower surface 82. Moreover, the angled notch 110 may be disposed closer to the first end surface 100 than to the second end surface 102. As is best shown in FIGS. 4 and 5, the angled notch 110 may have a first notch surface 120 and a second notch surface 122.

The first notch surface 120 may engage the fastener 28. The first notch surface 120 may be substantially planar and may extend at an angle toward the first axis 56. For example, the first notch surface 120 may become progressively closer to the first axis 56 in an axial direction that extends from the first end surface 100 toward the second end surface 102. Thus, the first notch surface 120 may be disposed in a nonparallel and non-perpendicular relationship with the first axis 56. In addition, the first end surface 100 may be disposed substantially perpendicular to the center plane along which FIGS. 3-5 are sectioned. As is best shown in FIGS. 4 and 5, the first notch surface 120 may be partially received in or may intersect the fastener hole 88 or may be visible through the fastener hole 88 when viewed from the perspective shown.

The second notch surface 122 may extend from an end of the first notch surface 120. More specifically, the second notch surface 122 may extend from an end of the first notch surface 120 in a direction that extends away from the first axis 56. In the configuration shown in FIG. 4, the second notch surface 122 extends from an end of the first notch surface 120 to the first end portion 104. In the configuration shown in FIG. 5, second notch surface 122 extends from an end of the first notch surface 120 to the kingpin taper 108'. As is best shown in FIGS. 4 and 5, the second notch surface 122 may be disposed in the kingpin receiving hole 86 and may be disposed outside of the fastener hole 88 or may not be visible through the fastener hole 88 when viewed from the perspective shown.

Referring to FIGS. 1 and 2, one or more stops 74 may be provided with the axle beam 22. For instance, a pair of stops 74 may be provided on opposite sides of each end portion 72 of the axle beam 22. The stops 74 may extend outwardly from and may be integrally formed with the axle beam 22. A stop 74 may be configured to engage the steering knuckle 20 to limit rotational movement of the steering knuckle 20 about the first axis 56.

Referring to FIGS. 2-5, the thrust bearing 26 may rotatably support the steering knuckle 20. The thrust bearing 26 may be disposed between the axle beam 22 and the second arm 34 of the steering knuckle 20. For instance, the thrust bearing 26 may extend from the lower surface 82 of the axle beam 22 to the second arm 34. The thrust bearing 26 may extend around the kingpin 24 and may have any suitable configuration. For instance, the thrust bearing 26 may be a journal bearing or a roller bearing assembly that may have a plurality of rolling elements.

Referring to FIGS. 2-5, the fastener 28 may help secure the kingpin 24 to the axle beam 22. The fastener 28 may extend through the fastener hole 88 and may be received in the angled notch 110 of the kingpin 24. For example, the fastener 28 may include a draw key that may have an angled contact surface 130 that may be disposed parallel to and may engage the first notch surface 120 as is best shown in FIGS. 4 and 5. As is best shown in FIG. 2, the fastener 28 may also include a nut 132, such as a lock nut, that may threadingly engage the draw key to help secure the fastener 28 to the axle beam 22.

Referring to FIGS. 4 and 5, the fastener 28 may exert force that may inhibit axial and radial movement of the kingpin 24 with respect to the first axis 56. For instance, the fastener 28 may exert force along vector $F_1$ to bias the kingpin 24 toward the upper surface 80 and inhibit movement of the kingpin 24 in an axial direction that extends toward the lower surface 82. The fastener 28 a may also exert force along vector $F_2$ toward the beam portion 70 of the axle beam 22 and away from the fastener hole 88 to inhibit radial movement of the kingpin 24.

In one or more configurations, the axle assembly may permit a kingpin to be assembled to an axle beam with a single fastener or single draw key that may be disposed closer to the upper surface of the axle beam than to the lower surface. This may reduce manufacturing costs and help improve durability of the axle assembly as compared to an axle assembly that employs multiple fasteners, such as upper and lower draw keys. In such a configuration, the upper and lower draw keys are disposed on opposite sides of the kingpin with one draw key being located near the top of the axle beam and the other draw key being located near the bottom of the axle beam. The lower draw key and/or the axle beam may be susceptible to shearing due to the high stress loads exerted on the lower draw key. Elimination of the lower draw key may therefore reduce the number of parts in the axle assembly and may reduce manufacturing and assembly costs and complexity as a hole for the lower draw key may be omitted along with associated machining operations.

In addition, eliminating the lower draw key and its corresponding hole in the axle beam may help improve the strength of the axle beam and may allow the axle beam to be provided with less material near its lower surface. Deletion of the lower draw key may allow for more compact axle assembly designs in that additional clearance does not need to be provided between the steering knuckle and the lower draw key and/its lock nut, which could otherwise reduce the maximum turning angle or angular rotation of the steering knuckle about the kingpin of such clearance was omitted.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle beam that includes:
   an upper surface;
   a lower surface disposed opposite the upper surface;
   a kingpin receiving hole that extends from the upper surface to the lower surface, Wherein the kingpin receiving hole has a tapered portion that extends between the lower surface and the upper surface, wherein the tapered portion extends from the lower surface to a cylindrical connecting portion that extends from the tapered portion to the upper surface; and
   a fastener hole that intersects the kingpin receiving hole, wherein the fastener hole intersects the connecting portion;
   a kingpin disposed in the kingpin receiving hole; and
   a fastener that is disposed in the fastener hole that engages the kingpin to inhibit movement of the kingpin.

2. The axle assembly of claim 1 wherein the kingpin receiving hole extends from the lower surface toward the upper surface and has a smaller diameter at the upper surface than at the lower surface.

3. The axle assembly of claim 1 wherein the kingpin receiving hole extends along a first axis and a diameter of the tapered portion decreases in an axial direction that extends from the lower surface toward the upper surface.

4. The axle assembly of claim 1 wherein the tapered portion has a frustoconical configuration.

5. The axle assembly of claim 1 wherein the fastener hole is disposed closer to the upper surface than the tapered portion.

6. The axle assembly of claim 1 wherein the kingpin has only one angled notch that receives and engages the fastener.

7. The axle assembly of claim 1 wherein the kingpin receiving hole extends along a first axis, only one fastener hole is provided in the axle beam, and the fastener hole is disposed substantially perpendicular to the first axis and is disposed closer to the upper surface than the lower surface.

8. The axle assembly of claim 1 wherein the kingpin has a first end surface, a second end surface disposed opposite the first end surface, a first end portion that extends from the first end surface, and a second end portion that extends from the second end surface to a kingpin taper.

9. The axle assembly of claim 8 wherein the first end portion and the second end portion are substantially cylindrical and the first end portion has a smaller diameter than the second end portion.

10. An axle assembly comprising:
    an axle beam that includes:
    an upper surface;
    a lower surface disposed opposite the upper surface;
    a kingpin receiving hole that is disposed around a first axis and extends from the upper surface to the lower surface, wherein the kingpin receiving hole includes a tapered portion that extends from the lower surface to the upper surface such that the kingpin receiving hole has a larger diameter at the lower surface than at the upper surface; and
    a fastener hole that intersects the kingpin receiving hole;
    a kingpin that is received in the kingpin receiving hole and has a kingpin taper that mates with the tapered portion to inhibit movement of the kingpin toward the upper surface, a first end surface, a second end surface disposed opposite the first end surface, a first end portion that extends from the first end surface to the kingpin taper, and a second end portion that extends from the second end surface to the kingpin taper, wherein the first end portion and the second end portion are substantially cylindrical and the first end portion has a smaller diameter than the second end portion;

a fastener that is disposed in the fastener hole that engages the kingpin to inhibit movement of the kingpin away from the upper surface; and a steering knuckle that is rotatably disposed on the kingpin.

11. The axle assembly of claim 10 wherein the kingpin taper and the tapered portion have frustoconical configurations.

12. The axle assembly of claim 10 wherein the kingpin taper is completely received in the kingpin receiving hole.

13. The axle assembly of claim 10 wherein the kingpin has only one angled notch that receives and engages the fastener.

14. The axle assembly of claim 13 wherein the angled notch is disposed closer to the first end surface of the kingpin than the second end surface of the kingpin.

15. The axle assembly of claim 13 wherein the angled notch is disposed in the first end portion and the angled notch and the fastener are disposed closer to the upper surface than the lower surface.

16. An axle assembly comprising:
an axle beam that includes:
an upper surface;
a lower surface disposed opposite the upper surface;
a kingpin receiving hole that is disposed around a first axis and extends from the upper surface to the lower surface, wherein the kingpin receiving hole includes a tapered portion that extends from the lower surface toward the upper surface such that the kingpin receiving hole has a larger diameter at the lower surface than at the upper surface; and
a fastener hole that intersects the kingpin receiving hole;
a kingpin that is received in the kingpin receiving hole and has a kingpin taper that mates with the tapered portion to inhibit movement of the kingpin toward the upper surface, a first end surface, a second end surface disposed opposite the first end surface, a first end portion that extends from the first end surface to the kingpin taper, a second end portion that extends from the second end surface to the kingpin taper, and an angled notch that has a first notch surface that is substantially planar and that is disposed in a nonparallel and non-perpendicular relationship with the first axis, and a second notch surface that extends from an end of the first notch surface, wherein the first notch surface intersects the fastener hole and the second notch surface is disposed in the kingpin receiving hole and outside of the fastener hole;

a fastener that is disposed in the fastener hole that engages the kingpin to inhibit movement of the kingpin away from the upper surface, wherein the angled notch receives and engages the fastener; and a steering knuckle that is rotatably disposed on the kingpin.

17. The axle assembly of claim 16 wherein the fastener hole intersects the tapered portion.

18. The axle assembly of claim 16 wherein the first axis is disposed in a center plane that bisects the axle beam, the angled notch is disposed substantially perpendicular to the center plane, the fastener has an angled contact surface that engages and is disposed substantially parallel to the first notch surface of the angled notch, and the fastener biases the kingpin toward the upper surface and away from the fastener hole.

19. The axle assembly of claim 16 wherein the kingpin has only one angled notch that receives and engages the fastener.

20. The axle assembly of claim 16 wherein the tapered portion extends from the lower surface to the upper surface.

* * * * *